(12) United States Patent
Jacksen

(10) Patent No.: US 7,251,400 B1
(45) Date of Patent: Jul. 31, 2007

(54) ABSORPTIVE CLAD FIBER OPTIC FACEPLATE TUBE

(75) Inventor: Niels Frederick Jacksen, Fincastle, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 47 days.

(21) Appl. No.: 11/151,498

(22) Filed: Jun. 13, 2005

(51) Int. Cl.
*G02B 6/04* (2006.01)
*H01J 43/00* (2006.01)
*H01J 40/00* (2006.01)
*H01J 31/50* (2006.01)
*H01J 40/18* (2006.01)

(52) U.S. Cl. .................. 385/120; 385/115; 313/103 R; 313/103 CM; 313/523; 313/524; 313/525; 313/527; 313/528; 313/530

(58) Field of Classification Search ................ 385/120; 313/103 CM, 528
See application file for complete search history.

(56) References Cited

U.S. PATENT DOCUMENTS

| | | | |
|---|---|---|---|
| 4,093,562 A * | 6/1978 | Kishimoto | ................. 252/511 |
| 4,264,408 A * | 4/1981 | Benham | ...................... 216/25 |
| 4,912,314 A | 3/1990 | Sink | |
| 5,268,612 A * | 12/1993 | Aebi et al. | ........... 313/103 CM |
| 6,005,239 A * | 12/1999 | Suzuki et al. | ......... 250/214 VT |
| 6,396,049 B1 * | 5/2002 | Estrera et al. | ........ 250/214 VT |

FOREIGN PATENT DOCUMENTS

EP  0 896 231  2/1999

OTHER PUBLICATIONS

Search Report of French Application No. 06 52512 dated Mar. 16, 2007.

* cited by examiner

*Primary Examiner*—Frank G. Font
*Assistant Examiner*—Ryan Lepisto
(74) *Attorney, Agent, or Firm*—RatnerPrestia

(57) ABSTRACT

A limiter device is used as a fiber optic faceplate (FOFP) night vision goggle for limiting light or laser induced damage on a vacuum side of the FOFP. The limiter device includes a plurality of longitudinally extending optical fibers, each bundled to each other to form a light input surface on an external side of the FOFP and a light output surface on the vacuum side of the FOFP. The optical fibers include fiber optic cores and a glass cladding surrounding each of the cores. A portion of the glass cladding is replaced by an optical absorber material extending longitudinally away from the light input surface. The optical absorber material may extend longitudinally about 1-20 microns away from the light input surface.

13 Claims, 8 Drawing Sheets

ABSORPTIVE CLAD FIBER OPTIC FACEPLATE TUBE

FIELD OF THE INVENTION

This invention relates, generally, to imaging devices. More particularly, this invention relates to a limiter device used as a fiber optic faceplate (FOFP) night vision goggle (NVG) to limit laser induced damage on the vacuum side of the FOFP. This invention also relates to a contrast enhancer used in fiber optic imaging devices.

BACKGROUND OF THE INVENTION

FIG. 8 is a cross-sectional view of a conventional image intensifier tube, generally designated as 80. As shown, image intensifier tube 80 includes a fiber optic cathode plate, generally designated as 81, microchannel plate (MCP) 82, and a fiber optic anode plate, generally designated as 83. Light enters fiber optic cathode plate 81 and is guided through multiple fibers 85 striking a GaAs photocathode 89, that is bonded to surface 87 of the fiber optic cathode plate. Due to photoelectric conversion, electrons are emitted from photocathode 89. The electrons exiting from fiber optic cathode plate 81 are amplified by MCP 82. These electrons are accelerated and caused to impinge on phosphor face 84 of fiber optic anode plate 83, thereby emitting fluorescent light. The emitted light is guided through fiber optic anode plate 83, by way of multiple fibers 86, so as to yield output light.

Although not shown, the exiting light from fiber optic anode plate 83 may be coupled to a charge coupled device (CCD) by way of a tapered fiber optic coupler. As shown in FIG. 8, output surface 87, MCP 82 and phosphor face 84 are contained within a vacuum formed by housing 88.

It will be appreciated that image intensifier tube 80 is not drawn to scale. More specifically, multiple fibers 85 and multiple fibers 86, respectively, in the fiber optic cathode plate and the fiber optic anode plate are not drawn to scale. There are typically millions of fibers 85 and 86, in these cathode and anode plates.

As shown in FIG. 9, each of multiple fibers 85 and 86 include fiber 90, which may or may not be of the same materials or dimensions. Fiber 90 includes glass rod 92 and glass cladding 91, which surrounds the glass rod. The glass material of cladding 91 is different from the glass material of rod 92.

Optical fiber 90 is formed in the following manner. A glass rod and a cladding tube, coaxially surrounding the glass rod, are suspended vertically in a furnace. The temperature of the furnace is elevated to the softening temperature of the glass. The rod and cladding tube fuse together into single fiber 90. Fiber 90 is fed into a traction mechanism, where the speed is adjusted until a desired fiber diameter is achieved. The fiber is then cut into shorter lengths.

Several thousands of the cut single fiber 90 are then stacked into a mold and heated to a softening temperature of the glass, in order to form an array 100, as shown in FIG. 10. Array 100 is also known as a multi assembly or a bundle and includes several thousand single fibers 90, each having a rod and a cladding. The multi assembly 100 is suspended vertically in a drawing machine and drawn to decrease the fiber diameter, while still maintaining the configuration of the individual fibers. The multi assembly 100 is then cut into shorter lengths of bundles.

Several hundreds of the cut bundles 100 are then stacked and packed together into a large diameter glass tube (not shown). After stacking and packing the bundles, the entire assembly is heated and fused together. In this manner, active areas of the fiber optic cathode plate and the fiber optic anode plate are formed from the millions of individual fibers 90.

Strong light energy entering a fiber optic faceplate, such as fiber optic cathode plate 81 or fiber optic anode plate 83, has been known to damage the image intensifier tube. Any damage to the gallium arsenide (GaAs) photocathode 89 or any other downstream components caused by strong laser light produces a permanent black spot on the image tube.

Attempts have been made to create an absorber cladding in the fiber optic bundle. These efforts have been focused on drawing a fiber that contains an absorber within the cladding materials. It has been conjectured that these absorbers in the fiber cladding may enhance the effectiveness of a fiber optic faceplate in limiting laser induced damage to the GaAs deposited on the vacuum side of the fiber optic faceplate. Other efforts have attempted to use cladding materials in the fiber optic bundle that selectively blackens when exposed to hydrogen gas.

The efforts for producing a fiber optic bundle with absorbing cladding material requires several steps. First, a fiber having an absorbing or other reactive cladding must be placed in a drawing machine and drawn to a desired diameter size. Each of these fibers must then be fused into a bundle that may contain over 1 million fibers. The bundle must next be fused to a GaAs wafer (for example) to form the photocathode.

To the best of the inventor's knowledge, the above efforts have not been attempted, since they likely take significant investments to overcome known and unknown material and process incompatibilities to eventually form a modified fiber optic faceplate. In addition, the materials in the modified fiber optic faceplate must be compatible with image tube assembly, sealing and activation processes, which have required decades to stabilize in order to achieve today's high performance and reliability levels.

What is needed is a method for making a limiter device for fiber optic faceplate night vision goggles which limits any damage from strong light entering the image intensifier tube. In addition, the modified fiber optic faceplate materials must be compatible with conventional image tube assembly, activation and sealing processes. This invention addresses such a need.

SUMMARY OF THE INVENTION

To meet this and other needs, and in view of its purposes, the present invention provides a fiber optic faceplate (FOFP) having a plurality of optical fibers, each including a cladding surrounding an optical fiber core, in which the optical fiber core extends between light input and output surfaces. The cladding includes first and second portions, in which the first portion surrounds the optical fiber core adjacent to the input surface, and the second portion surrounds the optical fiber core between one end of the first portion and the output surface. The first and second portions are of different materials. The first portion may extend approximately 1 to 20 microns between the input surface and the one end. The fiber optic faceplate may be a fiber optic cathode plate of an image intensifier tube. In addition, the first portion may be formed of an optically absorbing material including one of spin-on absorber glass, gallium arsenide (GaAs), gold, or other metal, optically absorbing metal oxides (such as zinc oxide) and optically absorbing polymers.

In another embodiment, the present invention provides a limiter device used as a fiber optic faceplate (FOFP) night vision goggle for limiting laser induced damage on a vacuum side of the FOFP. The limiter device includes a plurality of longitudinally extending optical fibers, each bundled to each other to form a light input surface on an external side of the FOFP and a light output surface on the vacuum side of the FOFP. The optical fibers include fiber optic cores and a glass cladding surrounding each of the cores. A portion of the glass cladding is replaced by an absorber material extending longitudinally away from the light input surface. The absorber material may extend longitudinally about 1-20 microns away from the light input surface. The absorber material may be different from the glass cladding. In addition, the absorber material may include one of spin-on absorber glass, gallium arsenide (GaAs), gold or other metal, optically absorbing metal oxides (such as zinc oxide) and optically absorbing polymers.

In yet another embodiment, the present invention provides a contrast enhancer for a fiber optic imaging device. The contrast enhancer includes a plurality of longitudinally extending optical fibers, each bundled to each other to form a light input surface and a light output surface. The optical fibers include fiber optic cores and a glass cladding surrounding each of the cores. A portion of the glass cladding is replaced by an absorber material extending longitudinally away from the light input surface. The absorber material may extend longitudinally about 1-20 microns away from the light input surface. The absorber material may be different from the glass cladding, and may include one of spin-on absorber glass, gallium arsenide (GaAs), gold, or other metal, optically absorbing metal oxides (such as zinc oxide) and optically absorbing polymers.

In still another embodiment, the present invention provides a method of making an optically absorptive clad fiber optic faceplate (FOFP). The method includes the steps of: (a) first etching a top of a FOFP to remove portions of fiber cores to provide first cavities formed by walls of tubular claddings; (b) depositing etch resistant material on top of the FOFP to fill the first cavities formed by the walls of the tubular claddings; (c) planarizing the top of the FOFP; (d) second etching the top of the FOFP to remove portions of the walls of the tubular claddings to provide second cavities formed by walls of the fiber cores; and (e) depositing optical absorber material into the second cavities.

The method may include the step of: (f) planarizing the top of the FOFP, after the depositing of step (e). Step (a) may include first etching the top of either a fiber optic cathode plate or a fiber optic anode plate of an image intensifier tube. Furthermore, prior to the first etching of step (a), the method may integrate the FOFP into an image intensifier tube.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
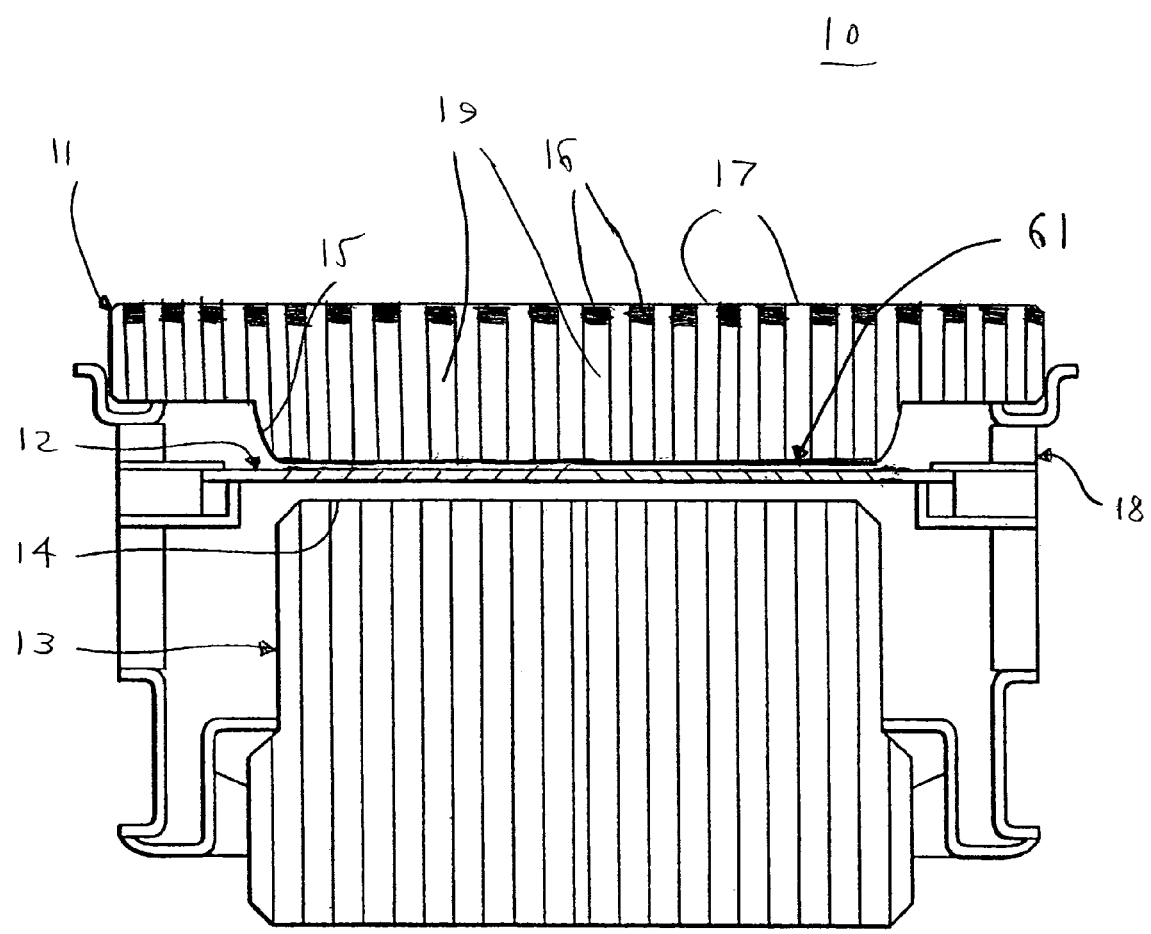
FIG. 1 is a cross sectional view of an image intensifier tube, which includes an embodiment of the present invention.

Referring first to FIG. 1, there is shown image intensifier tube 10 which includes an embodiment of the present invention. As shown, image intensifier tube 10 includes fiber optic cathode plate 11, MCP 12 and fiber optic anode plate 13. The fiber optic cathode plate includes output face 15 (including GaAs photocathode 61), and the fiber optic anode plate includes phosphor face 14. Output face 15, MCP 12 and phosphor face 14 are contained within a vacuum chamber that is maintained by housing 18.

Fiber optic cathode plate 11 includes several thousands of fiber rods 17 which are surrounded by tubular claddings 19. As will be described in detail, in accordance with an embodiment of the invention, an absorber cladding material, generally designated as 16, replaces the top portions of tubular claddings 19. Absorber cladding material 16 is effective in absorbing laser radiation and, consequently, protecting the optical performance of image intensifier tube 10.

A method of the invention will now be described, by reference to FIGS. 2A, 2B, 3A, 3B, 4 and 5, for replacing a top portion of the many tubular claddings of a fiber optic faceplate with an absorber cladding material, such as absorber cladding material 16 shown in FIG. 1.

A method of placing the absorber cladding material into the top portion of a fiber optic faceplate may be performed after imaging intensifier tube 10 has already been sealed and evacuated. The method of the present invention advantageously affects only the top portion (no more than 20 microns approximately) of the fiber optic faceplate, at its light inputting side. This top portion, after the imaging tube has been sealed, may be reworked multiple times, if required, before the imaging tube is discarded.

Figure 6:
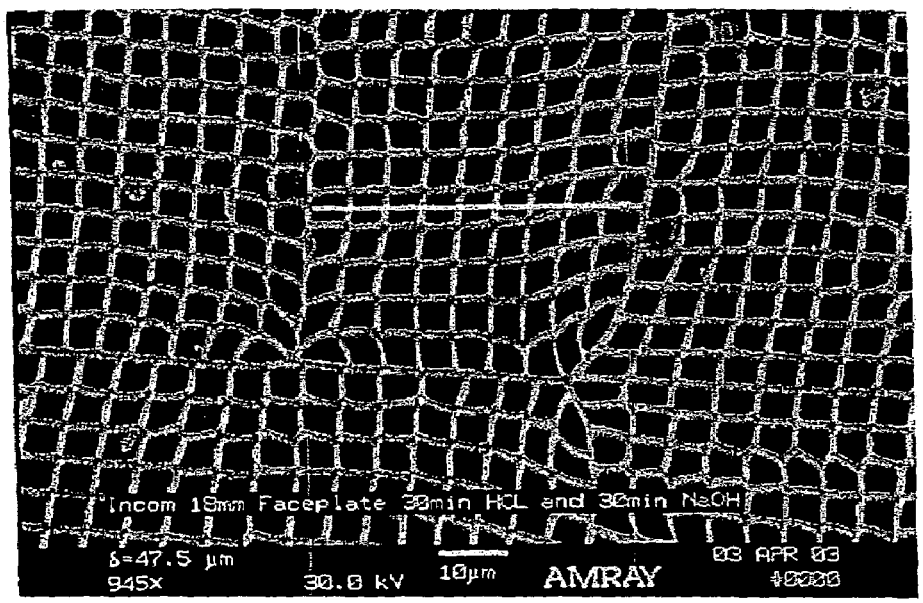
FIG. 6 illustrates a top view of an irregularly shaped fiber optic bundle, which may have absorber material deposited thereon, in accordance with an embodiment of the present invention.

The method of the present invention is effective on irregularly shaped fiber optic bundles, such as the irregularly shaped fiber optic bundles shown in FIG. 6. The method of the present invention replaces the top layer of the tubular claddings in an optical fiber bundle with an absorber material that provides laser protection with minimal degradation of night vision goggle optical performance. Furthermore, the method of the present invention does not require a uniform fiber optic faceplate, nor does it require photolithographic processing techniques.

Figure 2A:
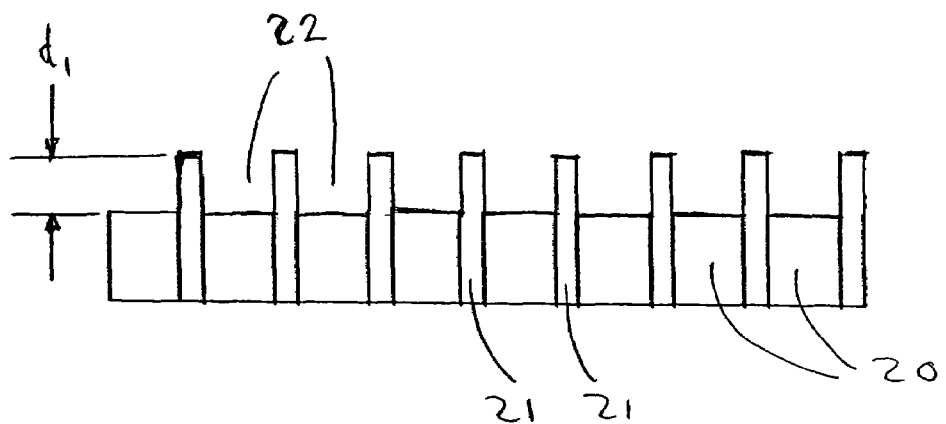
FIGS. 2A, 2B, 3A, 3B, 4 and 5 illustrate a method of making a fiber optic faceplate for limiting light or laser induced damage on an output side of the fiber optic faceplate, in accordance with an embodiment of the present invention.

The first step of an embodiment of the invention etches the fiber cores (or rods), as shown in FIG. 2A. Fiber cores 20 are etched to a depth of $d_1$ maximum. As shown, tubular claddings 21, which remain and are unaffected by the etching, form cavities 22 having a depth of $d_1$, from 1-20 microns which may be nominally 3 microns (but may also be from 1-20 microns).

Figure 2B:
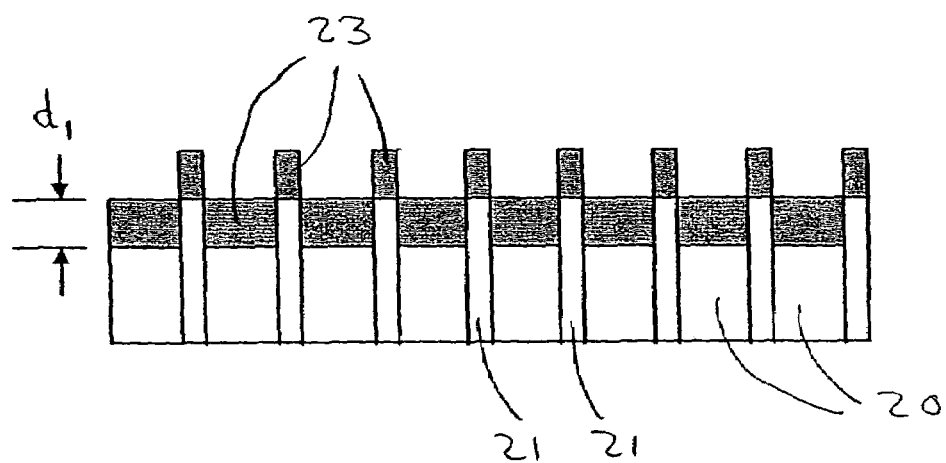

Etch resistant material is next deposited on top of the fiber optic faceplate (which may be a cathode fiber optic plate or an anode fiber optic plate), as shown in FIG. 2B. The etch resistant material, designated generally as 23, completely fills cavities 22 and forms a layer above and on top of each tubular cladding 21.

The etch resistant material preferably has a high adhesion to glass and is resistant to cladding type of etching substances. Furthermore, the etch resistant material is capable of surviving the next step of planarization. The etch resistant material may include a refractory metal, such as chrome, nickel chrome, or equivalent. The etch resistant material may also be a dielectric material, such as silicon nitride.

Figure 3A:
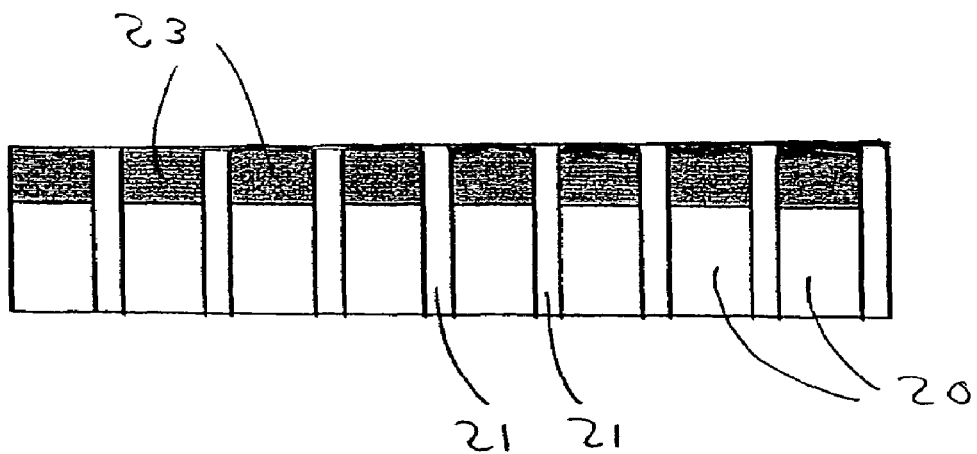

The next step of the method planarizes the fiber optic faceplate to expose the cladding. This is shown in FIG. 3A, in which the deposited etch resistant material has been planarized and have the tops of fiber cores 20 and the tops of tubular claddings 21 at the same level. As another alternative, a simple polishing process may suffice. Submicron planarization requirements, which are common in the semiconductor industry, are desirable, but likely not required.

Figure 3B:
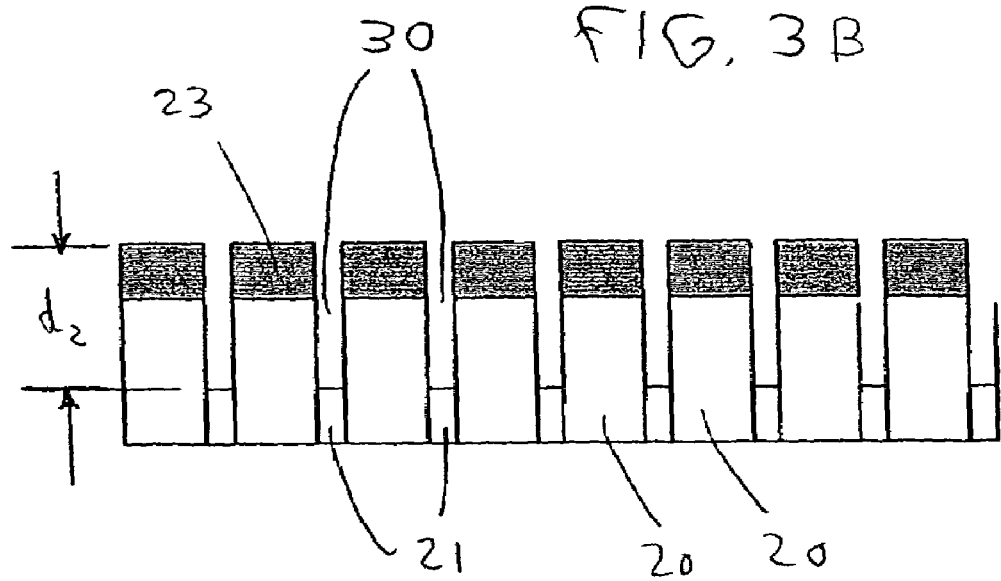

The method of the present invention, next etches tubular claddings 21, as shown in FIG. 3B. The etching step is performed to a depth of $d_2$. The depth to which the tubular claddings are etched may be approximately 1-20 microns to form cavities 30, as shown. It will be appreciated that ion beam etching may be better than liquid etching, because liquid etching tends to propagate into the glass-metal interface. The etching material used to etch the tubular claddings are selected based on a tradeoff between the relative etching rates of the tubular claddings versus the degree of protection provided to the protective layers on top of the fiber cores (shown as layers 23).

The method of the present invention next removes protective layers 23. This removal step may include mechanical planarization, liquid chemical or dry (ion beam machine) processes. In an alternative embodiment, protective layers 23 need not be removed, before proceeding to the next step.

Figure 4:
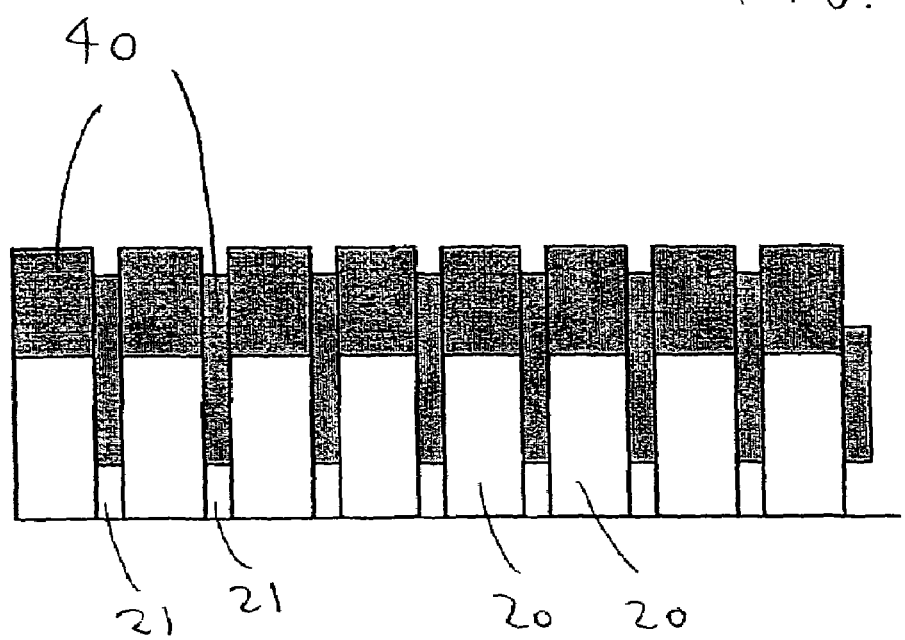

The method of the present invention then deposits optically absorbing material into cavities 30, as shown in FIG. 4. The optically absorbing material, generally designated as 40, fills cavities 30 and forms additional layers on top of fiber cores 20, as shown. The optically absorbing material may include spin-on absorber glass.

The spin-on absorber glass is preferably fired at a temperature that does not degrade the fiber optic faceplate's optical and mechanical properties. Another candidate for the absorber material may include spin-on absorber polymer. Yet another candidate for the absorber material may include GaAs.

It will be understood that other candidates for absorber material 40 may include various physical vapor deposition materials. Ion beam deposition and sputtering techniques may be used to deposit this type of absorber material, because ion beam deposition and sputtering advantageously are not directionally applied. Candidate deposition materials may include absorbing glass (glass with reduced lead content).

Metals such as gold at high base pressures may also be used. It will be appreciated that gold deposited at around 1 Torr results in flaky aggregates that provides good absorptive properties. Another candidate may be iron that is processed to produce light absorbing films in a low temperature or plasma environment. More candidates may include other optically absorbing metal, optically absorbing metal oxides (such as zinc oxide) and optically absorbing polymers.

Figure 5:
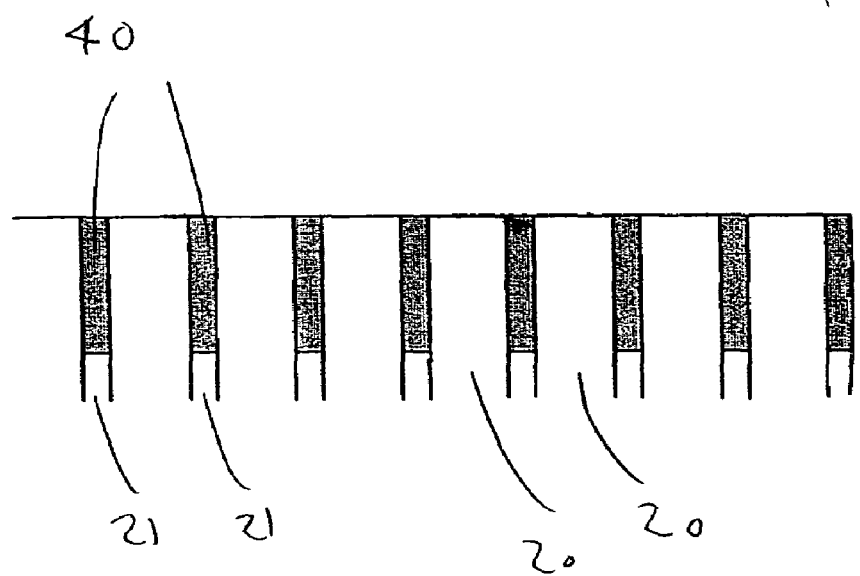

A final step of the method of the present invention includes planarization, in which the top portions of absorber material 40 is planarized and polished. The planarization step is carried out down to a level that exposes the tops of fiber cores 20. A planarized fiber optic faceplate is shown in FIG. 5. As shown, the completed fiber optic faceplate includes exposed tops of fiber cores 20 and absorber material 40 having replaced the top portions of tubular claddings 21.

The aforementioned method of the present invention achieves the absorptive polymer clad fiber optic cathode plate 11 of image intensifier tube 10, as shown in FIG. 1. The method described may be performed on the fiber optic cathode plate before it is integrated into housing 18. As also described, the method may be performed on the fiber optic cathode plate, after fiber optic imaging tube 10 is completely integrated into housing 18 and evacuated.

In another embodiment of the present invention, the aforementioned method may be applied to the fiber optic anode plate, generally designated as 13 in FIG. 1.

Figure 7:
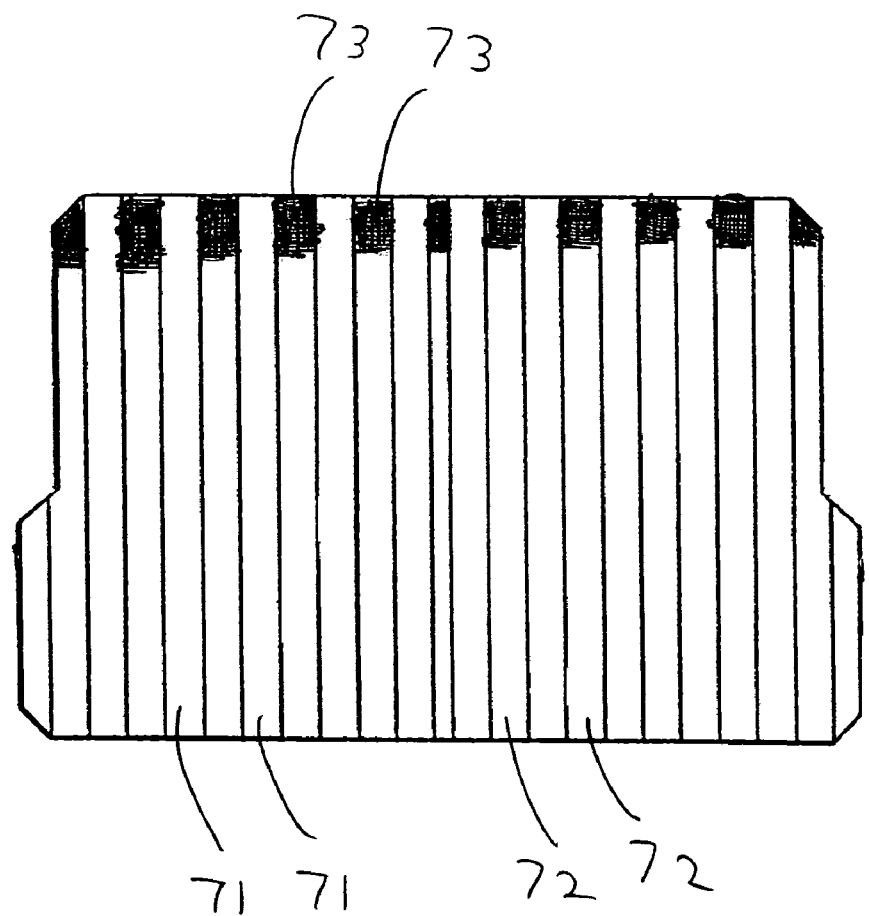
FIG. 7 is a sectional view of a fiber optic anode plate for an imaging intensifier tube, which includes the absorber material, in accordance with an embodiment of the present invention.
Figure 8:
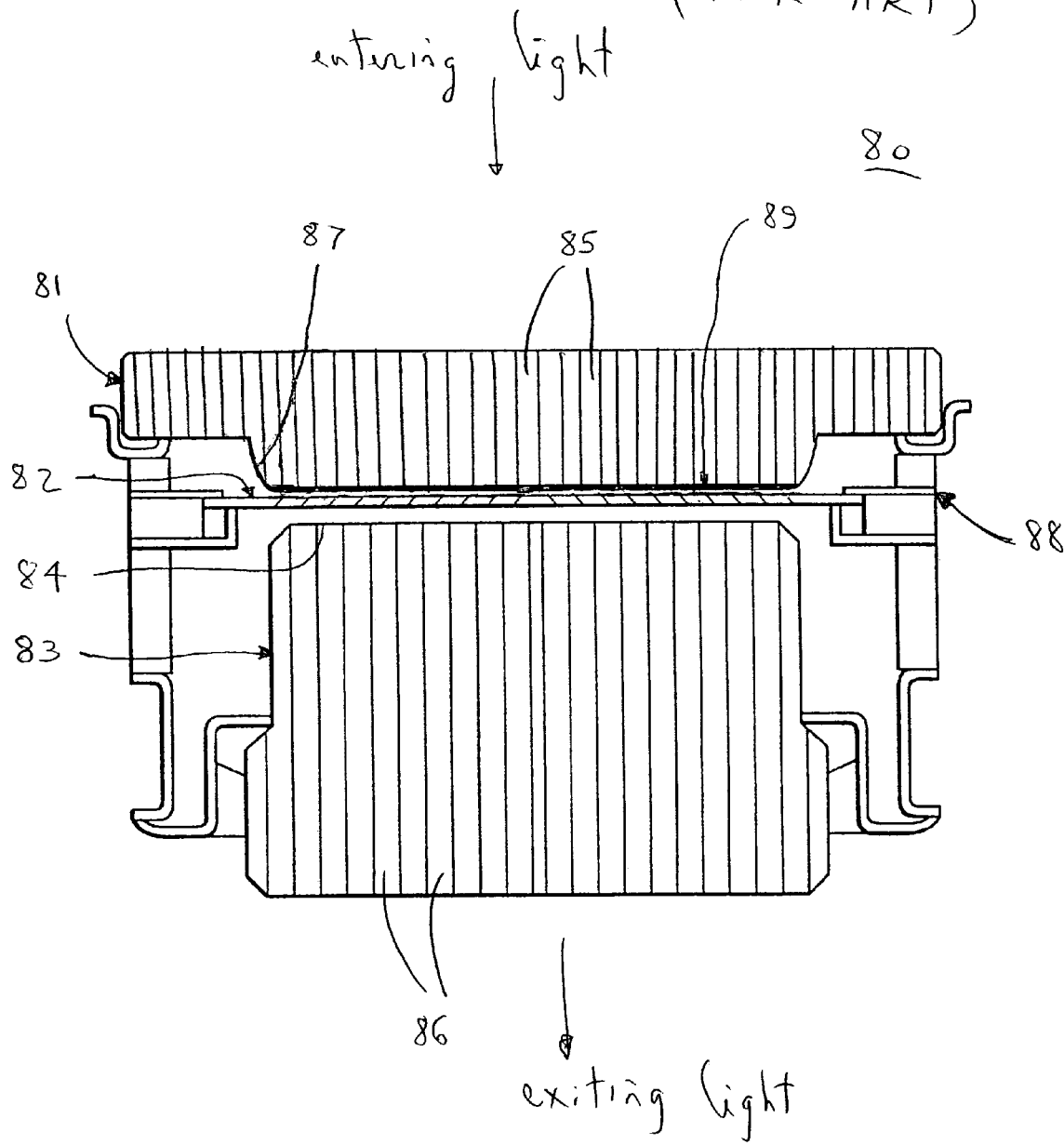
FIG. 8 is a sectional view of an image intensifier tube including a fiber optic cathode plate and a fiber optic anode plate.
Figure 9:
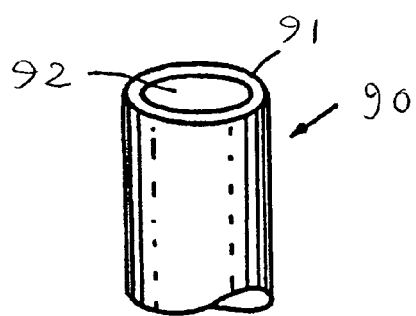
FIG. 9 illustrates an optical fiber including a fiber optic core surrounded by a glass cladding.
Figure 10:
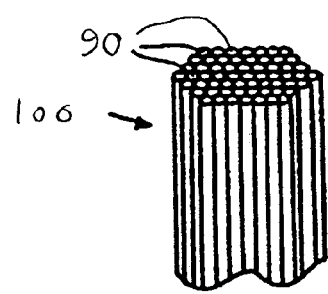
FIG. 10 depicts many optical fibers of FIG. 9 stacked together into a bundle for use as light receiving photo cathode or photo anode plates.

As best shown in FIG. 7, fiber optic anode plate 70 includes fiber cores 71 and tubular claddings 72. By applying the previously described method of the present invention, the top portion of the fiber optic anode plate includes the absorbed polymer clad material, generally designated as 73. The method of the present invention would, of course, have to be performed on fiber optic anode plate 70, before it is integrated into housing 18 of FIG. 1.

In another embodiment of the present invention, the method described above may be used to absorb stray or scattered light in any fiber optic imaging device or any other device containing bundles of optical fibers. The method of the present invention may be applicable to any fiber optic device and is not limited to image intensifier tubes for night vision goggles. Any device that includes multiple fiber cores surrounded, respectively, by multiple tubular claddings may benefit from the method of the present invention. Light entering the tubular claddings may be effectively absorbed by the absorptive cladding deposited at an input surface of the fiber optic device.

Typically, light entering the tubular claddings is scattered, rather than internally reflected. If left unattended, this light acts as cross talk between the fiber cores, and ultimately results in serious reduction in image contrast at the output surface of the fiber optic device. The method of the present invention, on the other hand, results in an absorptive layer at the input surface and very efficiently absorbs the stray or scattered light, thereby enhancing image contrast at the output surface of the fiber optic device.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A fiber optic faceplate (FOFP) comprising
a plurality of optical fibers, each including a cladding surrounding an optical fiber core, in which the optical fiber core extends between light input and output surfaces, and
the cladding including first and second portions, in which the first portion surrounds the optical fiber core adjacent to the input surface, and
the second portion surrounds the optical fiber core between one end of the first portion and the output surface,
wherein the first and second portions are of different materials,
the first and second portions include first and second cross-sectional areas, respectively, and
the first cross-sectional area has a value identical to a value of the second cross-sectional area.

2. The fiber optic faceplate of claim 1 wherein
the first portion is formed of an optically absorptive polymer.

3. The fiber optic faceplate of claim 1 wherein
the first portion extends approximately 1 to 20 microns between the input surface and the one end.

4. The fiber optic faceplate of claim 1 wherein
the fiber optic faceplate is a fiber optic cathode plate of an image intensifier tube.

5. The fiber optic faceplate of claim 1 wherein the first portion is formed of an optical absorber material including one of spin-on absorber glass, gallium arsenide (GaAs), gold, other metal, optically absorbing metal oxides, or optically absorbing polymers.

6. A limiter device used as a fiber optic faceplate (FOFP) night vision goggle for limiting laser induced damage on a vacuum side of the FOFP, the limiter device comprising
a plurality of longitudinally extending optical fibers, each bundled to each other to form a light input surface on an external side of the FOFP and a light output surface on the vacuum side of the FOFP,
the optical fibers including fiber optic cores and a glass cladding surrounding each of the cores,
wherein a portion of the glass cladding is replaced by an optical absorber material extending longitudinally away from the light input surface,
the optical absorber material and the glass cladding include first and second cross-sectional areas, respectively, and
the first cross-sectional area has a value identical to a value of the second cross-sectional area.

7. The limiter device of claim 6 wherein
the optical absorber material extends longitudinally about 1-20 microns away from the light input surface.

8. The limiter device of claim 6 wherein
the optical absorber material is different from the glass cladding.

9. The limiter device of claim 6 wherein
the optical absorber material includes one of spin-on absorber glass, gallium arsenide (GaAs), gold, other metal, optically absorbing metal oxides, or optically absorbing polymers.

10. A contrast enhancer for a fiber optic imaging device comprising
a plurality of longitudinally extending optical fibers, each bundled to each other to form a light input surface and a light output surface,
the optical fibers including fiber optic cores and a glass cladding surrounding each of the cores,
wherein a portion of the glass cladding is replaced by an optical absorber material extending longitudinally away from the light input surface,
the optical absorber material and the glass cladding include first and second cross-sectional areas, respectively, and
the first cross-sectional area has a value identical to a value of the second cross-sectional area.

11. The contrast enhancer of claim 10 wherein
the optical absorber material extends longitudinally about 1-10 microns away from the light input surface.

12. The contrast enhancer of claim 10 wherein
the optical absorber material is different from the glass cladding.

13. The contrast enhancer of claim 10 wherein
the optical absorber material includes one of spin-on absorber glass, gallium arsenide (GaAs), gold, other metal, optically absorbing metal oxides, or optically absorbing polymers.

* * * * *